Patented Nov. 16, 1926.

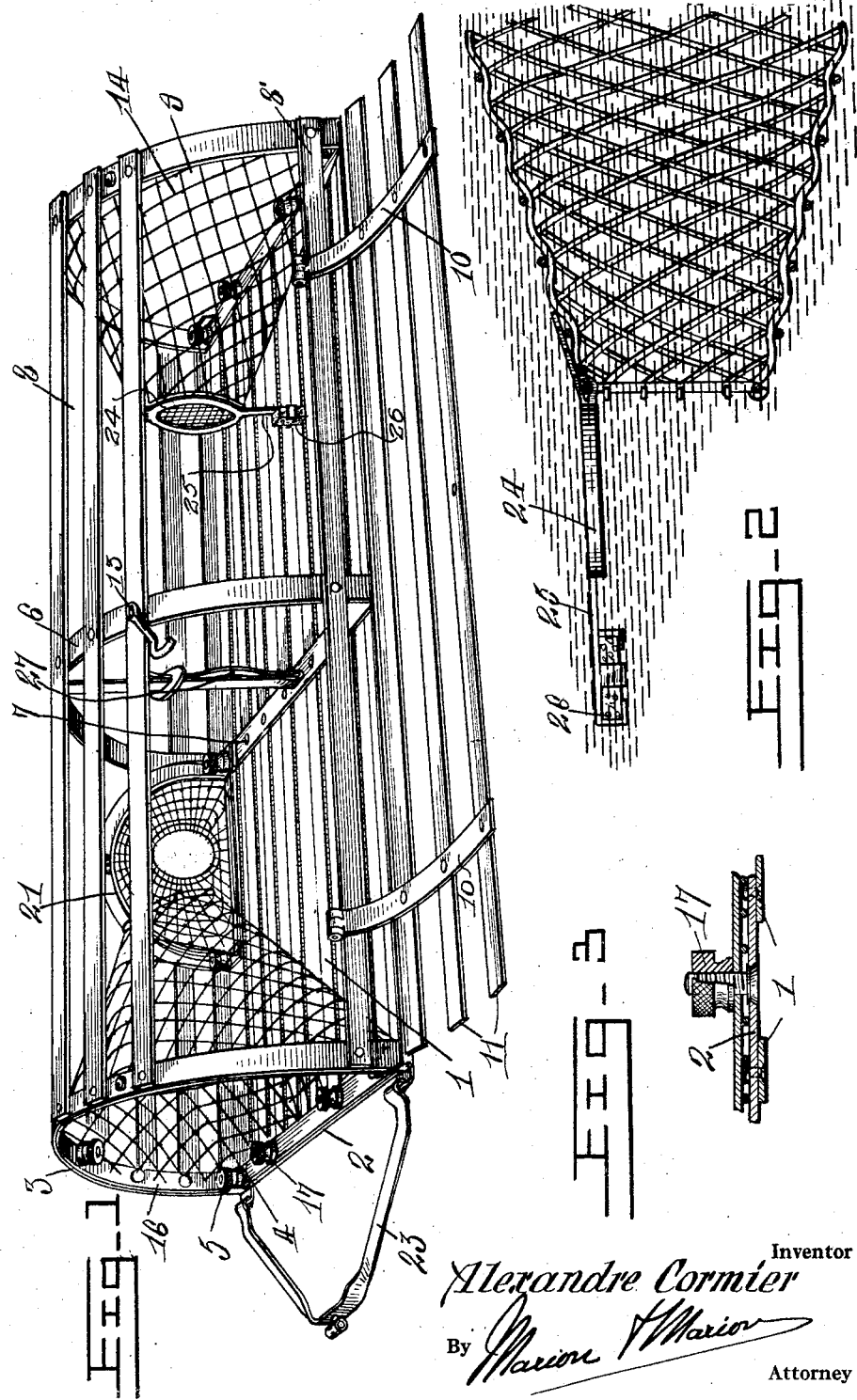

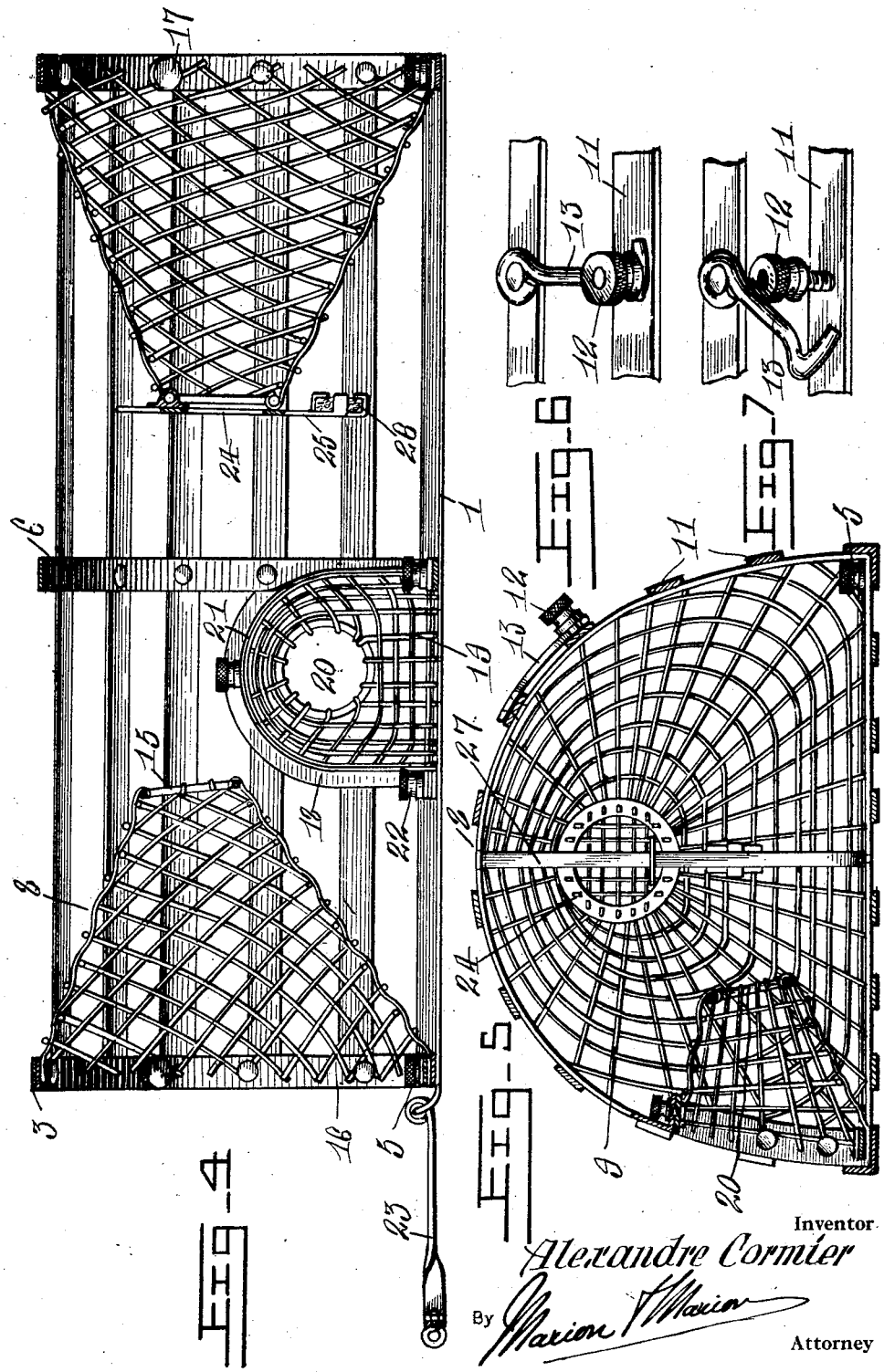

1,607,443

UNITED STATES PATENT OFFICE.

ALEXANDRE CORMIER, OF MONTREAL, QUEBEC, CANADA.

LOBSTER TRAP.

Application filed June 28, 1926. Serial No. 119,221.

The present invention pertains to a novel lobster trap, and the object is the provision of a device of this character which will be more durable in service than the traps of present construction.

This object is accomplished by constructing the frame-work of the trap of metal, preferably aluminium, which has been found to withstand satisfactorily the action of salt water. Nets through which the lobsters enter are inserted in the ends of the frame-work, and each net has an arched frame member which is detachably secured to the frame-work. Due to these connections, the nets may readily be removed for repair or replacement.

A further feature of the invention resides in providing a door at the net which takes the lowermost position when the trap is drawn out of the water. This door carries a float by which it is raised to open position when the trap is submerged under usual conditions. When the trap is being drawn out of the water, the lowermost net is closed by this door so that the lobsters cannot escape through the lower end of the trap.

The invention is fully disclosed in the following description and in the accompanying drawings in which:

Figure 1 is a perspective view of the trap in open position;

Figure 2 is a detail elevation of the device while in the water;

Figure 3 is a detail section;

Figure 4 is a longitudinal section;

Figure 5 is a transverse section; and

Figures 6 and 7 are detail perspective views of the latch.

Reference to these views will now be made by use of like characters which are employed to designate corresponding parts throughout.

The trap is constructed upon a base which includes parallel slats 1 joined at the ends by bars 2. Arched members 3 are mounted upon the bars and are formed at their ends with flanges 4 which are secured to the ends of the bars preferably by means of clamp screws 5. Another arched member 6 is placed transversely of the slats 1 intermediate their ends and secured thereto by rivets 7 or other suitable devices. Slots 8 are extended between the end arches 3 and secured thereto in any suitable manner, covering the same except for an opening 9 which is retained at one side. The slat 8' at the lower edge of the opening has a pair of strips 10 pivotally connected thereto, and another series of slats 11 is secured transversely of these strips in order to form a door. The uppermost slat of the door carries a screw clamp 12 as illustrated in detail in Figures 6 and 7. The particular slat 8 which lies adjacent the free end of the member 11 of the door carries a pivoted latch 13 which is receivable beneath the member 12 and adapted to be secured thereby.

The various arches, slats and accessories which have been described are constructed of metal, preferably aluminium which has been found to be non-corrosive in salt water.

In each end of the structure is inserted a net consisting of a screen 14 of conical formation. The inner end 15 of each net is open and held by an arched frame 16 which fits snugly within the corresponding arch 3. The members 3 and 16 are held together by several screw clamps 17 so that the nets may readily be removed for replacement or repair.

At one side of the device an opening is formed through the slats 8 as shown in Figure 4, and the ends of the broken slats are joined by an arched frame 18. Within this frame is mounted another net 19 which converges to a relatively small opening 20 at one end thereof as shown in Figures 1 and 4. The larger end of this net carries a frame 21 which is secured to the surrounding frame 20 by means of screw clamps 22 such as those previously described.

To one end of the base is pivoted a bracket 23 to which may be attached a towing rope for pulling the device out of the water. The net at the opposite end has its smaller opening 15 provided with a hinged screen door 24 as shown in detail in Figure 2. This door carries an arm 25 to which is attached a float 26, whereby the door is normally held in raised or open position when the trap is in the water. In the arch 6 is mounted a hook 27 or similar supporting member to which a bait may be attached.

When the trap is submerged, the door 24 is raised to open position as already stated, and the remaining parts are permanently open. The lobsters which find their way into the trap through the conical nets do not escape, since it is the tendency of the lobster to seek lower depths. When the trap is raised from the water while pulling on the bracket 23, the end nets 9 are placed in a vertical axis, and the lower one is closed by the door 24 so that the lobster cannot escape through the adjacent opening. The trap is emptied by opening the door 10—11 and removing the contents in an obvious manner.

In the use of this device it has been found that, due to the metallic character of the various parts, a more durable and lasting construction may be obtained. The nets which require attention are readily removed by loosening the screw clamps 17. The frame-work of the trap is less subject to breakage in handling than the ordinary wooden traps, whereby the cost of maintenance is greatly reduced.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:

1. A lobster trap comprising a metallic frame-work, conical nets inserted therein, a door hinged to the opening of the net at the opposite end, and a float carried by said door.

2. A lobster trap comprising a frame-work constructed of arched members and slats connecting said members, conical nets inserted in the ends of said frame-work, a door hinged at the opening of one of said nets, and a float carried by said door.

3. A lobster trap comprising a frame-work constructed of arched metallic members and metallic slats connecting said members, conical nets inserted in the ends of said frame-work, a door hinged at the opening of one of said nets, and a float carried by said door.

4. A lobster trap comprising a frame-work constructed of arched members and slats connecting said members, conical nets open at both ends, an arched frame at the larger end of each net, said arched frames being secured in the arched members of said frame work, a door hinged in the open end of one of said nets, and a float carried by said door.

5. A lobster trap comprising a frame-work constructed of arched members and slats connecting said members, conical nets open at both ends, an arched frame at the larger end of each net, said arched frames being secured in the arched members of said frame-work, a door hinged in the open end of one of said nets, a float carried by said door, and a bracket pivoted to the end of the frame work opposite said door.

6. A lobster trap comprising a frame-work constructed of arched members and slats connecting said members, conical nets inserted in the ends of said frame-work, a door hinged at the opening of one of said nets, a float carried by said door, and a device positioned within said frame-work for supporting bait.

7. A lobster trap comprising a frame-work constructed of arched members and slats connecting said members, conical nets open at both ends, an arched frame at the larger end of each net, said arched frames being secured in the arched members of said frame-work, a door hinged in the open end of one of said nets, a float carried by said door, and a device positioned within said frame-work for supporting bait.

8. A lobster trap comprising a frame-work constructed of arched members and slats connecting said members, conical nets open at both ends, an arched frame at the larger end of each net, said arched frames being secured in the arched members of said frame-work, a door hinged in the open end of one of said nets, a float carried by said door, a bracket pivoted to the end of the frame-work opposite said door, a device positioned within said frame-work for supporting bait, and an emptying opening formed in said frame-work and a door hinged to the frame-work for closing said opening.

In witness whereof I have hereunto set my hand.

ALEXANDRE CORMIER.